(12) United States Patent
Husband et al.

(10) Patent No.: US 11,646,579 B2
(45) Date of Patent: May 9, 2023

(54) ELECTRICAL SYSTEMS

(71) Applicant: ROLLS-ROYCE plc, London (GB)

(72) Inventors: Stephen M Husband, Derby (GB); Jeffrey Hobday, Derby (GB); Graham P Bruce, Derby (GB); David F Brookes, Derby (GB)

(73) Assignee: ROLLS-ROYCE plc, London (GB)

( * ) Notice: Subject to any disclaimer, the term of this patent is extended or adjusted under 35 U.S.C. 154(b) by 130 days.

(21) Appl. No.: 17/001,990

(22) Filed: Aug. 25, 2020

(65) Prior Publication Data

US 2021/0070463 A1 Mar. 11, 2021

(30) Foreign Application Priority Data

Sep. 10, 2019 (GB) ...................................... 1913015

(51) Int. Cl.
*B64D 35/02* (2006.01)
*H02K 7/18* (2006.01)
(Continued)

(52) U.S. Cl.
CPC .............. *H02J 1/102* (2013.01); *B64D 35/02* (2013.01); *F02C 7/36* (2013.01); *H02K 7/1823* (2013.01);
(Continued)

(58) Field of Classification Search
CPC .... B64D 35/02; B64D 2221/00; B64D 27/02; B64D 2027/005; F02C 7/36; F02C 6/206;
(Continued)

(56) References Cited

U.S. PATENT DOCUMENTS

| 5,578,880 A | 11/1996 | Lyons et al. |
| 2005/0056021 A1 | 3/2005 | Belokon et al. |

(Continued)

FOREIGN PATENT DOCUMENTS

| EP | 2224578 A1 * | 9/2010 | ............... H02K 3/28 |
| EP | 2 579 430 A2 | 4/2013 | |

(Continued)

OTHER PUBLICATIONS

Feb. 12, 2021 extended Search Report issued in European Patent Application No. 20190180.8.

*Primary Examiner* — Joseph Ortega
(74) *Attorney, Agent, or Firm* — Oliff PLC

(57) ABSTRACT

Electrical systems for connecting rotary electric machines with gas turbine spools are provided. One such electrical system includes: a first rotary electric machine; a second rotary electric machine; a first set of bidirectional converter circuits; a second set of bidirectional converter circuits; and DC outputs for connection with an R-channel network. Each electrical machine is mechanically coupled with a respective gas turbine spool and has an identical even number $N \geq 4$ of phases, each phase having a respective index and including an identical number $P \geq 1$ of coils wound in a P-plex configuration in which adjacent phases are radially separated by $2\pi/NP$ mechanical radians. Each of the first and second converter circuits converts AC to and from DC, has a respective index n, and is connected with the P coils in the nth phase of the first and second rotary electric machines, respectively.

17 Claims, 12 Drawing Sheets

(51) Int. Cl.
*H02M 7/04* (2006.01)
*F02C 7/36* (2006.01)
*H02J 1/10* (2006.01)
*F02C 6/20* (2006.01)
*F01D 15/10* (2006.01)

(52) U.S. Cl.
CPC .......... *B64D 2221/00* (2013.01); *F01D 15/10* (2013.01); *F02C 6/206* (2013.01); *F05D 2220/76* (2013.01); *Y02T 50/50* (2013.01); *Y02T 50/60* (2013.01)

(58) Field of Classification Search
CPC .... F02C 7/26; F02C 6/00; H02J 1/102; H02K 7/1823; H02K 7/14; H02K 7/183; H02K 11/30; H02M 7/04; F01D 15/10; F05D 2220/76; F05D 2260/40311; Y02T 50/50; Y02T 50/60
See application file for complete search history.

(56) References Cited

U.S. PATENT DOCUMENTS

| | | |
|---|---|---|
| 2007/0259545 A1 | 11/2007 | Berenger |
| 2011/0285202 A1 | 11/2011 | Rozman et al. |
| 2013/0088017 A1* | 4/2013 | Jia .......................... H02K 3/28 310/210 |
| 2015/0123463 A1 | 5/2015 | Huang et al. |
| 2017/0226933 A1 | 8/2017 | Klonowski et al. |

FOREIGN PATENT DOCUMENTS

| | | |
|---|---|---|
| EP | 2 617 998 A2 | 7/2013 |
| EP | 3 254 962 A1 | 12/2017 |
| WO | 2007/031758 A2 | 3/2007 |

* cited by examiner

ELECTRICAL SYSTEMS

CROSS-REFERENCE TO RELATED APPLICATIONS

This specification is based upon and claims the benefit of priority from UK Patent Application Number 1913015.2 filed on 10 Sep. 2019, the entire contents of which are incorporated herein by reference.

TECHNICAL FIELD

This disclosure concerns electrical systems for connecting rotary electric machines with rotating machinery such as gas turbine spools.

BACKGROUND

In aerospace, the more electric engine (MEE) and more electric aircraft (MEA) concepts have been advocated for the substantial reduction in fuel consumption and complexity they bring. For example, one known aircraft configuration includes in its engines electric machines operable as both motors and generators so as to facilitate both generation of electrical power during flight but also starting of the engine and removal of the air-turbine starter. One engine configuration for this known aircraft includes such electric machines coupled to the high-pressure spool of a twin-spool turbofan. Another includes such electric machines coupled to the intermediate-pressure spool of a triple-spool turbofan.

Service experience has shown however that the means of electrical generation in such configurations can and do fail from time to time. In addition, the electrical aspects of the devices are considered complex systems and so a rate approach to certification is not possible. This imposes a requirement for fault-tolerant designs. It is accepted practice to provide single fault-tolerance, on the basis that the mean time before failure for the surviving system is sufficiently long.

Increasingly, it is seen as desirable to facilitate power transfer between spools of a gas turbine engine. Studies have shown that improvements in component life and specific fuel consumption are possible, which can be substantial on short-haul missions. Other studies have shown that augmentation of the core gas turbine using the electrical system allows reduction in the size of the turbomachinery.

Clearly, however, if the extreme position is taken to the extent that the safe flight of the vehicle relies on such an electrical power augmentation system, said system must have the requisite fault-tolerance to facilitate continued operation in the presence of a fault. Such a requirement may be summarised by saying that the engine is dispatchable in the presence of a single fault, i.e. even with a single fault having occurred, the electrical system may still tolerate another fault which will not cause a hazardous or catastrophic event.

Alongside developments in turbofans for airliners, vehicles such as electric vertical take-off and landing (EV-TOL) aircraft are being developed which require a similar approach to guarantee operational safety. Near term proposals are configured with redundant turboelectric generators for powering electric propellers. For the purposes of weight management, the turboelectric generators are likely to be single-spool gas turbines. In a similar way to multi-spool turbofan engines benefiting from shaft power transfer, it is beneficial in such installations to facilitate fault-tolerant transfer of power between the turboelectric generators, for example to allow in-flight relight.

Thus, it is an object of the invention to provide an electrical system for connecting rotary electric machines to gas turbine spools. It will be appreciated in view of the foregoing discussion that the gas turbine spools may form part of the same engine, or different engines.

In this specification, the following mathematical notation is assigned to objects for the purposes of clarity and conciseness. A collection of objects having an ordered relationship therebetween may be represented as a sequence of members. For a finite sequence—of length N, each member has an associated index n identifying its position in the sequence.

As used herein, the length of a sequence is denoted by an uppercase letter, with the variable representing the indices of the members of the sequence denoted by the equivalent lowercase letter. In this way it is possible herein to concisely define properties of each member of a sequence.

For example, let a sequence $\alpha$ have length $N=8$ such that the members each have an associated index n. It is possible to state that for all $n \equiv 0 \pmod{2}$, the nth member has property X. In this way a particular property is defined over the even-indexed members.

This is in contrast to having to set out that each of the second member, the fourth member, the sixth member, and the eighth member has property X.

Thus it may be seen that great improvements in conciseness are possible for sequences of large length with properties shared over a mathematically-defined sub-sequence.

Furthermore, say we wish to describe links between the members of a multiplicity of sequences. For example, let a sequence $\beta$ have a length $P=3$, and let a sequence $\gamma$ also have a length $P=3$. The members of both sequences therefore have an index p associated therewith.

Given these definitions, we may concisely state that for all $p=(1 \ldots P)$, the pth member of sequence $\beta$ is linked to the pth member of sequence $\gamma$.

This is in contrast to having to set out that the first member of sequence $\beta$ is linked to the first member of sequence $\gamma$, the second member of sequence $\beta$ is linked to the second member of set $\gamma$, and the third member of sequence $\beta$ is linked to the third member of sequence $\gamma$.

Whilst the statements are equivalent, it will be appreciated that by using the notation explained heretofore significant improvements in conciseness are achieved.

SUMMARY

The invention is directed towards electrical systems for connecting rotary electric machines with rotating machinery, which rotating machinery may comprise, for example, gas turbine spools. Thus, the invention is also directed towards a gas turbine comprising such electrical systems, and arrangements comprising two gas turbines and such electrical systems.

In an aspect, an electrical systems comprises:

a first rotary electric machine mechanically coupled with a first gas turbine spool and a second rotary electric machine mechanically coupled with a second gas turbine spool, each said electric machine having an identical even number $N \geq 4$ of phases, each phase having a respective index $n=(1, \ldots, N)$, and each phase comprising an identical number $P \geq 1$ of coils wound in a P-plex configuration in which adjacent phases are radially separated by $2\pi/NP$ mechanical radians;

a first set of N bidirectional converter circuits for conversion of alternating current (ac) to and from direct current (dc), each converter circuit having a respective index n and being connected with the P coils in the nth phase of the first rotary electric machine;

a second set of N bidirectional converter circuits for conversion of ac to and from dc, each converter circuit having a respective index n and being connected with the P coils in the nth phase of the second rotary electric machine;

a number $1 \leq R \leq N/2$ of dc outputs for connection with an R-channel electrical network, wherein each dc output has respective index $r=(1, \ldots, R)$;

wherein for all r, the rth dc output is connected with the dc side of the nth converter circuits in both the first set and second set, for which $n \pmod{R} = r$ is satisfied.

In an embodiment, N=4.

In an embodiment, P=2 such that the coils are wound in a duplex configuration.

In an embodiment, R=2.

In an embodiment, for all n, a dc side of the nth converter circuit in said first set is connected with a dc side of the nth converter circuit in said second set to facilitate dc power transfer between the first gas turbine spool and the second gas turbine spool.

In an embodiment, the electrical system further comprises N switch arrays each having a respective index n, wherein for all n, the nth switch array is configured to connect the nth converter circuits in the first and second sets to the corresponding dc output.

In an embodiment, each switch array comprises:
a first input connected with one of the converter circuits;
a second input connected with another of the converter circuits;
an output for connection to the dc output, and to which the first input and the second input are connected;
a first switch between the first input and the output;
a second switch between the second input and the output;
a bus tie across the first input and the second input, the bus tie comprising a third switch.

In an embodiment, the switch arrays are configured to operate in:
a non-fault condition in which the first switch and the second switch are closed, and the third switch is open;
a first fault condition in which the first switch is closed and the second and third switches are open;
a second fault condition in which the second switch is closed and the first and third switches are open;
a third fault condition in which the third switch is closed and the first and second switches are open.

In an embodiment, the first, second, and third switches all have the same electrical rating.

In an embodiment, each switch array comprises:
a first input connected with one of the converter circuits;
a second input connected with another of the converter circuits;
an output for connection with the dc output;
a node with which the first input, the second input and the output are connected;
a first switch between the first input and the node;
a second switch between the node and the output.

In an embodiment, the switch arrays are configured to operate in:
a non-fault condition in which the first switch and the second switch are closed;
a first fault condition in which the first switch is closed and the second switch is open;
a second fault condition in which the first and second switches are open.

In an embodiment, the first switch has half the electrical rating of the second switch.

In an embodiment, the switches are dc contactors.

In another aspect, there is provided a gas turbine engine having a low-pressure spool and a high-pressure spool, and further comprising the electrical system of the aforesaid type, in which the first gas turbine spool is the low-pressure spool and the second gas turbine spool is the high-pressure spool.

In another aspect, there is provided an arrangement comprising:
a first gas turbine engine having a spool;
a second gas turbine engine having a spool; and
the electrical system of the aforesaid type, in which the first gas turbine spool is the spool in the first gas turbine engine, and the second gas turbine spool is the spool in the second gas turbine engine.

In another aspect, there is provided an aircraft having an R-channel electrical network and comprising the aforesaid gas turbine or the aforesaid arrangement.

BRIEF DESCRIPTION OF THE DRAWINGS

Embodiments will now be described by way of example only with reference to the accompanying drawings, which are purely schematic and not to scale, and in which.

DETAILED DESCRIPTION

FIG. 1

Figure 1:
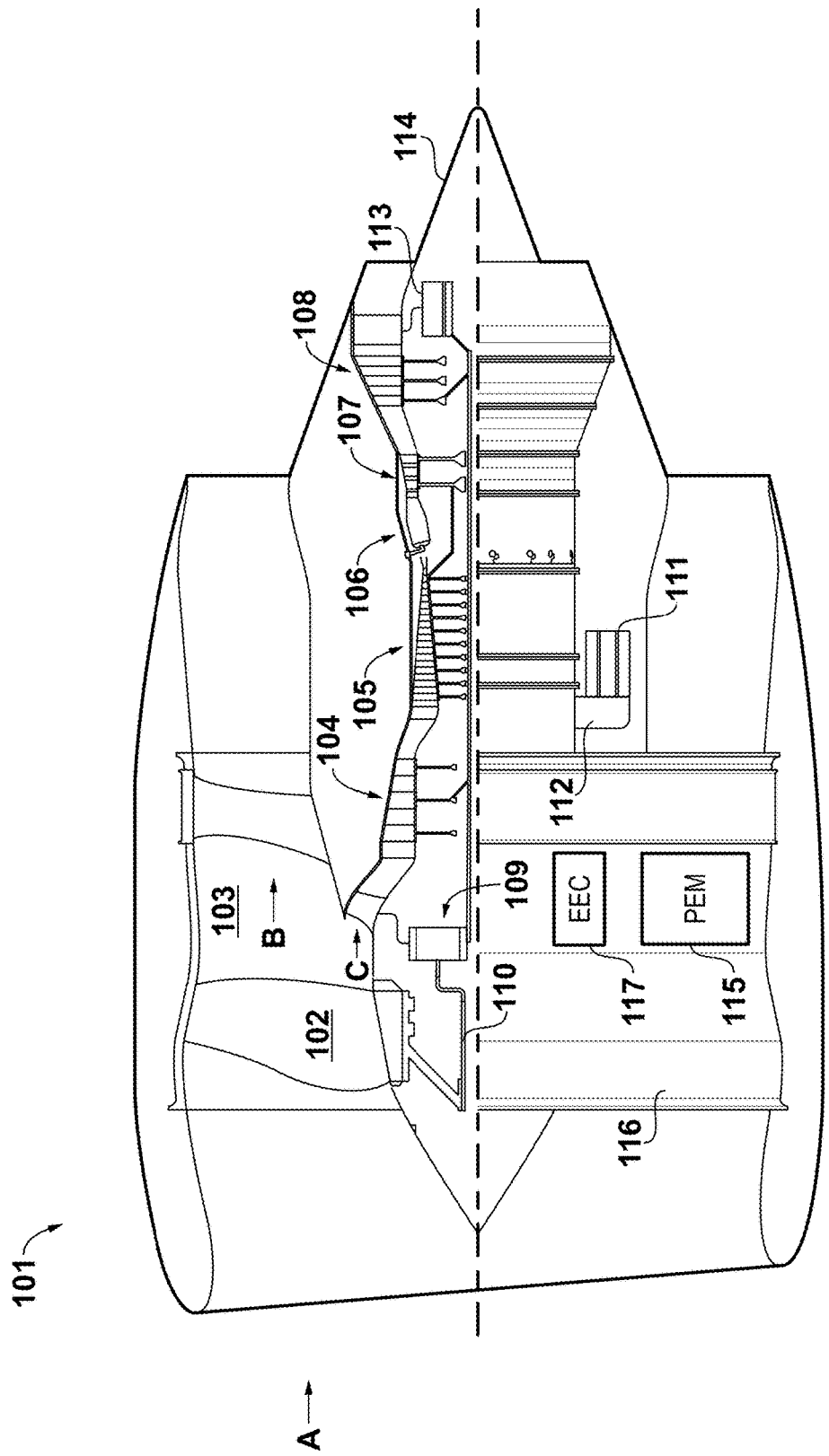
FIG. 1 shows a general arrangement of a turbofan engine for an aircraft, including a rotary electric machine on each spool thereof.

A general arrangement of an engine 101 for an aircraft is shown in FIG. 1. In the present embodiment, the engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn are meshed with a static ring gear. The rotating carrier drives the fan 102 via a fan shaft 110.

It will be appreciated that in alternative embodiments a star-configuration epicyclic gearbox (in which the planet carrier is static and the ring gear rotates and provides the output) may be used instead.

In order to facilitate electrical generation by the engine 101, a first rotary electric machine 111 capable of operating both as a motor and generator is mechanically coupled with the high-pressure spool. In the present embodiment, the first electric machine 111 is coupled to the high-pressure spool via a high-pressure spool driven, core-mounted accessory gearbox 112 of conventional drive configuration. Thus, as well as operation as a generator to supply an aircraft on which the engine 101 is installed with electrical power, the first electric machine 111 may drive the high-pressure spool to facilitate starting of the engine 101 in place of an air turbine starter, and may also drive it in certain flight phases to improve operability, fuel consumption, etc.

In alternative embodiments, the first electric machine 111 may be mounted coaxially with the turbomachinery in the engine 101. For example, the first electric machine 111 may be mounted axially in line with the duct between the low- and high-pressure compressors 104 and 105.

Similarly, a second rotary electric machine 113 capable of operating both as a motor and generator is mechanically coupled with the low-pressure spool. In the present embodiment, the second electric machine 113 is mounted in the tail cone 114 of the engine 101 coaxially with the turbomachinery and is coupled to the low-pressure turbine 108. In alternative embodiments, the second rotary electric machine 113 may be located axially in line with low-pressure compressor 104, which may adopt a bladed disc or bladed drum configuration to provide space for the second rotary electric machine 113.

It will of course be appreciated by those skilled in the art that any other suitable location for the first and second electric machines may be adopted.

In the present embodiment, the first and second electric machines are connected with power electronics. Extraction of power from, or application of power to the electric machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electric machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e. both of the core gas turbine and the first and second electric machines 111 and 113. In this way, the EEC 117 may holistically respond to both thrust demand and electrical power demand.

The internal configuration of PEM 115 guarantees fault-tolerant transfer of electric power between the first electric machine 111 and second electric machine 113. In this way, the turbomachinery may be designed to exploit the attendant advantages conferred by transfer of power between the high-pressure spool and the low-pressure spool. For example, transfer of power from the low-pressure spool to the high-pressure spool during the approach phase reduces the effective thrust of the engine 101 whilst maintaining sufficient high-pressure spool rotational speed to safely initiate a go-around manoeuvre. Further, in engine 101, transfer of power from the high-pressure spool to the low-pressure spool during a deceleration manoeuvre reduces the risk of weak extinction, therefore enabling a more optimal combustor design.

In an implementation contemplated herein, the PEM 115 is configured such that it may output to or receive electrical power from two dc busses—a configuration contemplated for future more electric aircraft platforms. The configuration of this electrical system will be described with reference to FIG. 2.

Various embodiments of the engine 101 may include one or more of the following features.

It will be appreciated that instead of being a turbofan having a ducted fan arrangement, the engine 101 may instead be a turboprop comprising a propeller for producing thrust.

The low- and high-pressure compressors 104 and 105 may comprise any number of stages, for example multiple stages. Each stage may comprise a row of rotor blades and a row of stator vanes, which may be variable stator vanes (in that their angle of incidence may be variable). In addition to, or in place of, axial stages, the low- or high-pressure compressors 104 and 105 may comprise centrifugal compression stages.

The low- and high-pressure turbines 107 and 108 may also comprise any number of stages.

The fan 102 may have any desired number of fan blades, for example 16, 18, 20, or 22 fan blades.

Each fan blade may be defined as having a radial span extending from a root (or hub) at a radially inner gas-washed location, or 0 percent span position, to a tip at a 100 percent span position. The ratio of the radius of the fan blade at the hub to the radius of the fan blade at the tip—the hub-tip ratio—may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The hub-tip ratio may be in an inclusive range bounded by any two of the aforesaid values (i.e. the values may form upper or lower bounds). The hub-tip ratio may both be measured at the leading edge (or axially forwardmost) part of the blade. The hub-tip ratio refers, of course, to the gas-washed portion of the fan blade, i.e. the portion radially outside any platform.

The radius of the fan 102 may be measured between the engine centreline and the tip of a fan blade at its leading edge. The fan diameter may be greater than (or on the order of) any of: 2.5 metres, 2.6 metres, 2.7 metres, 2.8 metres, 2.9 metres, 3 metres, 3.1 metres, 3.2 metres, 3.3 metres, 3.4 metres, 3.5 metres, 3.6 metres, 3.7 metres, 3.8 metres or 3.9 metres. The fan diameter may be in an inclusive range bounded by any two of the aforesaid values (i.e. the values may form upper or lower bounds).

The rotational speed of the fan 102 may vary in use. Generally, the rotational speed is lower for fans with a higher diameter. Purely by way of non-limitative example, the rotational speed of the fan at cruise conditions may be less than 2500 rpm, for example 2300 rpm. Purely by way of further non-limitative example, the rotational speed of the fan 102 at cruise conditions for an engine having a fan diameter in the range of from 2.5 metres to 3 metres (for example 2.5 metres to 2.8 metres) may be in the range of from 1700 rpm to 2500 rpm, for example in the range of from 1800 rpm to 2300 rpm, or, for example in the range of from 1900 rpm to 2100 rpm. Purely by way of further non-limitative example, the rotational speed of the fan at cruise conditions for an engine having a fan diameter in the range of from 3.2 metres to 3.8 metres may be in the range of from 1200 rpm to 2000 rpm, for example in the range of from 1300 rpm to 1800 rpm, for example in the range of from 1400 rpm to 1600 rpm.

In use of the engine 101, the fan 102 (with its associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the one-dimensional average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4. The fan tip loading may be in an inclusive range bounded by any two of the values in the previous sentence (i.e. the values may form upper or lower bounds).

The engine 101 may have any desired bypass ratio, where the bypass ratio is defined as the ratio of the mass flow rate of the flow B through the bypass duct to the mass flow rate of the flow C through the core at cruise conditions. Depending upon the selected configuration, the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the aforesaid values (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of the engine 101 may be defined as the ratio of the stagnation pressure upstream of the fan 102 to the stagnation pressure at the exit of the high-pressure compressor 105 (before entry into the combustor). By way of non-limitative example, the overall pressure ratio of the engine 101 at cruise may be greater than (or on the order of) any of the following: 35, 40, 45, 50, 55, 60, 65, 70, 75. The overall pressure ratio may be in an inclusive range bounded by any two of the aforesaid values (i.e. the values may form upper or lower bounds).

Specific thrust of the engine 101 may be defined as the net thrust of the engine divided by the total mass flow through the engine 101. At cruise conditions, the specific thrust of the engine 101 may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$, or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

The engine 101 may have any desired maximum thrust. For example, the engine 101 may be capable of producing a maximum thrust of at least (or on the order of) any of the following: 160 kilonewtons, 170 kilonewtons, 180 kilonewtons, 190 kilonewtons, 200 kilonewtons, 250 kilonewtons, 300 kilonewtons, 350 kilonewtons, 400 kilonewtons, 450 kilonewtons, 500 kilonewtons, or 550 kilonewtons. The maximum thrust may be in an inclusive range bounded by any two of the aforesaid values (i.e. the values may form upper or lower bounds). The thrust referred to above may be the maximum net thrust at standard atmospheric conditions at sea level plus 15 degrees Celsius (ambient pressure 101.3 kilopascals, temperature 30 degrees Celsius), with the engine 101 being static.

In use, the temperature of the flow at the entry to the high-pressure turbine 107 may be particularly high. This temperature, which may be referred to as turbine entry temperature or TET, may be measured at the exit to the combustor 106, for example immediately upstream of the first turbine vane, which itself may be referred to as a nozzle guide vane. At cruise, the TET may be at least (or on the order of) any of the following: 1400 kelvin, 1450 kelvin, 1500 kelvin, 1550 kelvin, 1600 kelvin or 1650 kelvin. The TET at cruise may be in an inclusive range bounded by any two of the aforesaid values (i.e. the values may form upper or lower bounds). The maximum TET in use of the engine 101 may be, for example, at least (or on the order of) any of the following: 1700 kelvin, 1750 kelvin, 1800 kelvin, 1850 kelvin, 1900 kelvin, 1950 kelvin or 2000 kelvin. The maximum TET may be in an inclusive range bounded by any two of the aforesaid values (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium-based metal or an aluminium based material (such as an aluminium-lithium alloy) or a steel-based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy.

Thus, purely by way of example, the fan blade may have a carbon-fibre or aluminium-based body with a titanium leading edge.

The fan 102 may comprise a central hub portion, from which the fan blades may extend, for example in a radial direction. The fan blades may be attached to the central portion in any desired manner. For example, each fan blade may comprise a fixture which may engage a corresponding slot in the hub. Purely by way of example, such a fixture may be in the form of a dovetail that may slot into and/or engage a corresponding slot in the hub/disc in order to fix the fan blade to the hub. By way of further example, the fan blades maybe formed integrally with a central hub portion. Such an arrangement may be a bladed disc or a bladed ring. Any suitable method may be used to manufacture such a bladed disc or bladed ring. For example, at least a part of the fan blades may be machined from a billet and/or at least part of the fan blades may be attached to the hub/disc by welding, such as linear friction welding.

The engine 101 may be provided with a variable area nozzle (VAN). Such a variable area nozzle may allow the exit area of the bypass duct to be varied in use. The general principles of the present disclosure may apply to engines with or without a VAN.

As used herein, cruise conditions have the conventional meaning and would be readily understood by those skilled in the art.

Such cruise conditions may be conventionally defined as the conditions at mid-cruise, for example the conditions experienced by the aircraft and/or engine at the midpoint (in terms of time and/or distance) between top of climb and start of descent. Cruise conditions thus define an operating point of the gas turbine engine which provides a thrust that would ensure steady state operation (i.e. maintaining a constant altitude and constant Mach number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach number are known, and thus the operating point of the engine at cruise conditions is clearly defined.

The cruise conditions may correspond to ISA standard atmospheric conditions at an altitude that is in the range of from 10000 to 15000 metres, such as from 10000 to 12000 metres, or from 10400 to 11600 metres (around 38000 feet), or from 10500 to 11500 metres, or from 10600 to 11400 metres, or from 10700 metres (around 35000 feet) to 11300 metres, or from 10800 to 11200 metres, or from 10900 to 11100 metres, or 11000 metres. The cruise conditions may correspond to standard atmospheric conditions at any given altitude in these ranges.

The forward speed at the cruise condition may be any point in the range of from Mach 0.7 to 0.9, for example one of Mach 0.75 to 0.85, Mach 0.76 to 0.84, Mach 0.77 to 0.83, Mach 0.78 to 0.82, Mach 0.79 to 0.81, Mach 0.8, Mach 0.85, or in the range of from Mach 0.8 to 0.85. Any single speed within these ranges may be the cruise condition. For some aircraft, the cruise conditions may be outside these ranges, for example below Mach 0.7 or above Mach 0.9.

Thus, for example, the cruise conditions may correspond specifically to a pressure of 23 kilopascals, a temperature of minus 55 degrees Celsius, and a forward Mach number of 0.8.

It will of course be appreciated, however, that the principles of the invention claimed herein may still be applied to engines having suitable design features falling outside of the aforesaid parameter ranges.

FIG. 2

Figure 2:
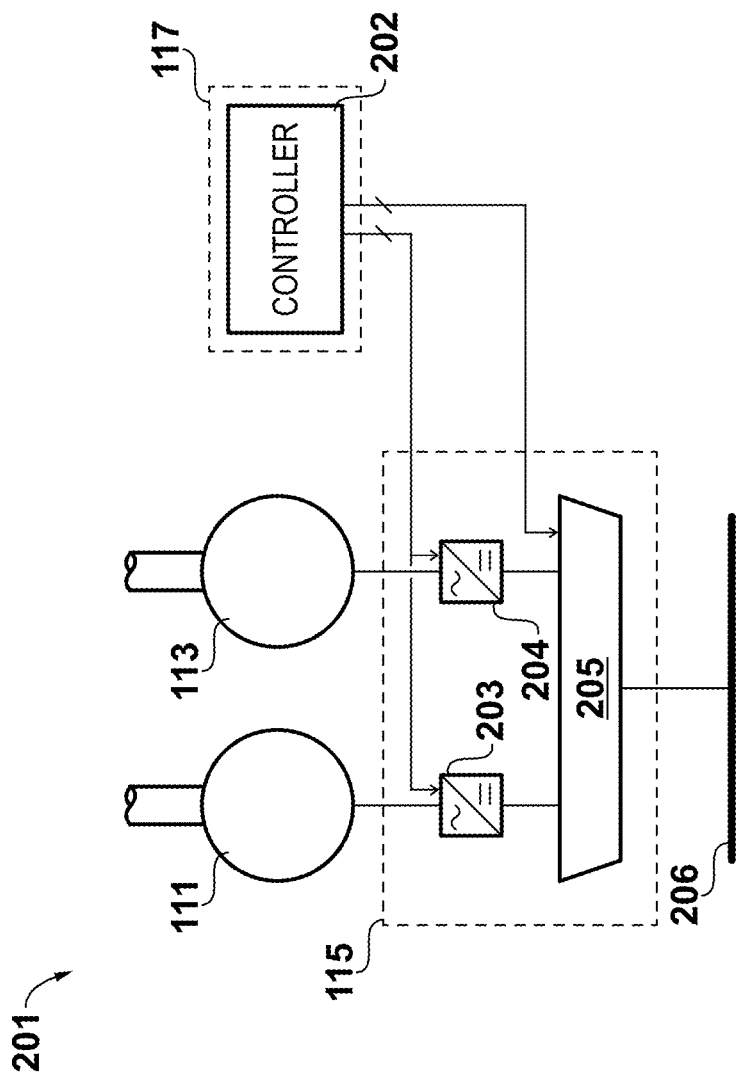
FIG. 2 shows an electrical system for connecting the electric machines of FIG. 1.

An electrical system 201 for connecting the first and second electric machines 111 and 113 to the high- and low-pressure spools is shown in FIG. 2. The electrical system 201 is shown in the form of a single line diagram, the conventions of which will be familiar to those skilled in the art. Thus for alternating current (ac) a single line replaces a plurality of polyphase lines, and for direct current (dc) a single line replaces the +V and −V lines.

Figure 3:
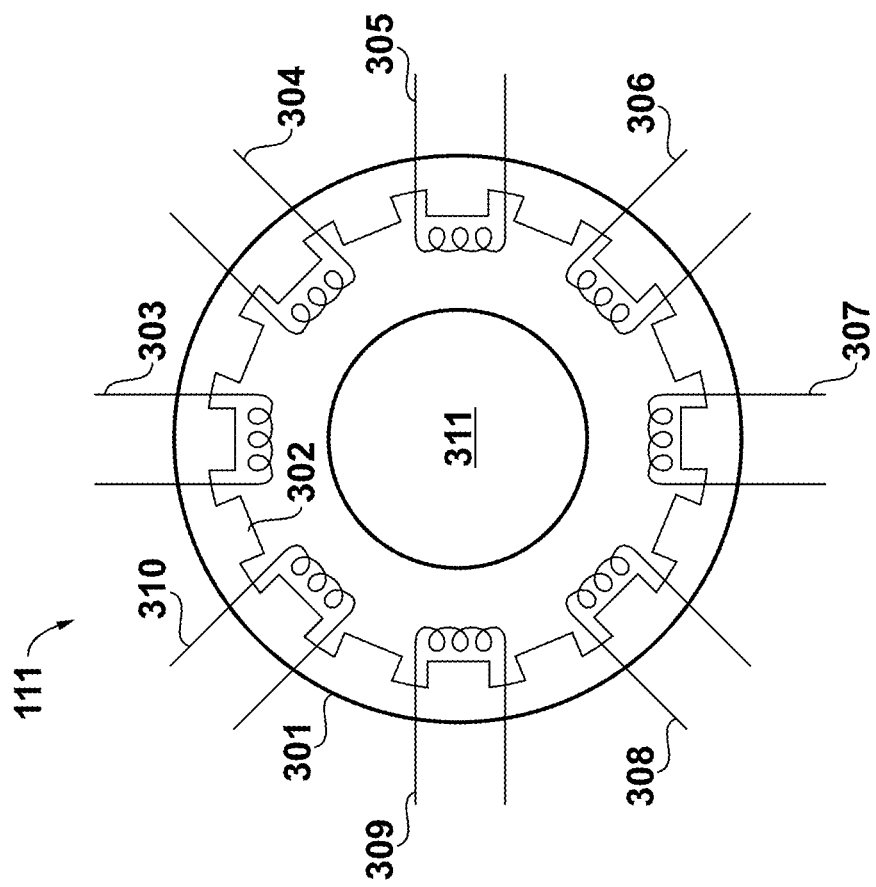
FIG. 3 shows the winding configuration of one of the electric machines of FIG. 1.

In the illustrated configuration, the ac output of the electric machines is provided to the PEM 115. The configuration of the electric machines will be described further with reference to FIG. 3.

A controller 202 for the PEM 115 is provided in the EEC 117. In the present example, the controller 202 is a functional module implemented in software running on the EEC 117. It will be appreciated that in alternative embodiments the controller 202 may be implemented in hardware in the EEC 117. It will also be appreciated that the controller 202 may be a separate module in addition to the EEC 117.

As shown in FIG. 2, a first set of bidirectional converter circuits 203 is connected with the first electric machine 111, and a second set of bidirectional converter circuits 204 is connected with the second electric machine 113.

The controller 202 is configured to control the operation of the first and second sets of bidirectional converter circuits 203 and 204 so as to control the operation of the electric machines 111 and 113.

In operation, the bidirectional converter circuits are configured to convert alternating current to and from direct current by either rectification or inversion under the control of the controller 202.

The direct current output of the converter circuits is provided to a switching arrangement 205, which is configured to interface with an electrical network 206, such as the electrical network on an aircraft.

In general terms, the electrical system 201 is an N-phase system.

Each one of the electric machines 111 and 113 has an identical even number $N \geq 4$ of phases, which defines the number of phases in the electrical system 201. Embodiments in which N=4 will be described with reference to FIGS. 3 to 8. An embodiment in which N=6 will be described with reference to FIG. 9.

Each phase in each electric machine comprises $P \geq 1$ coils wound in a P-plex configuration. For example, for P=2, the coils are wound in a duplex configuration. This configuration will be described further with reference to FIG. 3. The P-plex winding configuration results in each phase being separated by $2\pi/NP$ radians.

Each set of bidirectional converter circuits 203 and 204 comprises N individual converter circuits, each connected with the P coils in an equivalent phase in each electric machine.

In this way, the N phases in the electrical system 201 are isolated and independent as each machine phase has its own dedicated converter circuit, which improves fault tolerance.

The electrical network may be an R-channel network, $1 \leq R \leq N/2$. The switching arrangement 205 therefore comprises R dc outputs for connection to the R-channel network. Embodiments in which R=2 will be described with reference to FIGS. 3 to 9. An embodiment in which R=3 will be described with reference to FIG. 10.

In an embodiment, the switching arrangement 205 is configured to also connect equivalent phase bidirectional converter circuits to each other to facilitate power transfer between the first electric machine 111 and the second electric machine 113 without requiring connection to the electrical network 206.

In this way, various faults may be managed, whilst maintaining the capability to transfer power between the gas turbine spools and to and from an external electrical network.

FIG. 3

In this first example, the electrical system 201 is an N=4 phase system, with each phase having an associated index n=(1, . . . , 4). The winding configuration of the first electric machine 111 for this example is shown in schematic form in FIG. 3. In the present embodiment, the configuration—so far as described herein—of the second electric machine 113 is the same.

A primary advantage of an N=4 phase system is that the first electric machine 111 only needs to be over-rated by 33 percent in order to deliver the requisite drive or generating power in the presence of a fault with one of the phases. This is in contrast to dual-wound three-phase machines which are typically over-rated by 100 percent.

The first electric machine 111 comprises a stator 301. In the present embodiment, the stator 301 is configured as an alternate-wound stator. This means that the coils are evenly spaced on alternate teeth such that there is one coil side per slot—this arrangement may also be referred to as a modular winding. This provides physical, thermal, electrical, and magnetic isolation between the coils which provides fault tolerance.

In the present embodiment, P=2 thus each phase comprises two coils separated by r radians, i.e. in a duplex configuration. Adjacent phases are separated by $2\pi/NP=\pi/4$ radians. Pairing coils together in a duplex arrangement means that the machine is mechanically balanced, in particular during a fault condition when one or more phases may be disabled. It will be appreciated that a triplex or greater winding is possible and may be used to further improve rotordynamics, hence the parameterisation of the number of coils to the number P. Indeed, as set out herein it is also possible to utilise a single coil per phase, i.e. P=1, as this has advantages in terms of simplicity and in normal operation does not suffer from any imbalances. It is only during a fault condition that imbalance may occur, however this may be mitigated through implementation of sophisticated control algorithms in the controller 202—such approaches will be familiar to those skilled in the art and indeed have been implemented by the present applicant in aircraft fuel pump systems.

In the present embodiment, the stator 301 comprises teeth 302 defining slots therebetween. NP=8 coils (identified in the Figure as 303 through 310) each having an associated index np=(1, . . . , 8) are wound on the requisite sixteen teeth to achieve the alternate-wound configuration. In the present example, for all np, the (np)th coil forms part of the nth phase for which np (mod N)≡n is satisfied. Thus, the first coil 303 and fifth coil 307 form part of the first phase as both 1 and 5 are congruent modulo 4. Similarly, the second coil 304 and sixth coil 308 form part of the second phase as both 2 and 6 are also congruent modulo 4, and so on.

In the present embodiment, the first electric machine 111 is a permanent magnet electric machine. Thus, in operation as a motor, magnetic fields generated by the coils 303 to 310 interact with permanent magnets on a rotor 311 which generates torque. In operation as a generator, the magnetic field of the rotor 311 interacts with the coils 303 to 310 to generate a voltage. In the present embodiment, the magnets on the rotor 311 are samarium cobalt magnets, which material is selected due to its relatively high temperature capability. It is envisaged that if sufficient cooling capacity can be guaranteed, then neodymium magnets may be used instead. It will be appreciated that other known suitable permanent magnet materials may be substituted.

In a specific embodiment, short circuits are accommodated by configuring each coil to have a per-unit inductance of about unity. In an embodiment, the per-unit inductance is from 1.1 to 1.4. In a specific embodiment, the per-unit inductance is 1.25. In this way, the short circuit current is limited to from 1.1 to 1.4, and optionally 1.25, times normal operational values, which may be accommodated by providing appropriate insulation and cooling capacity, without imposing as high losses during normal operation as with a strict one-per-unit inductance design. In addition, this higher per-unit inductance provides sufficient margin for the controller 202 to differentiate between normal operating conditions and fault conditions.

In a specific embodiment a non-overlapping winding approach is adopted which results in smaller end-windings which improves efficiency.

It will be appreciated that a different machine types may be used, such as an induction machine or a switched-reluctance machine.

FIG. 4

Figure 4:
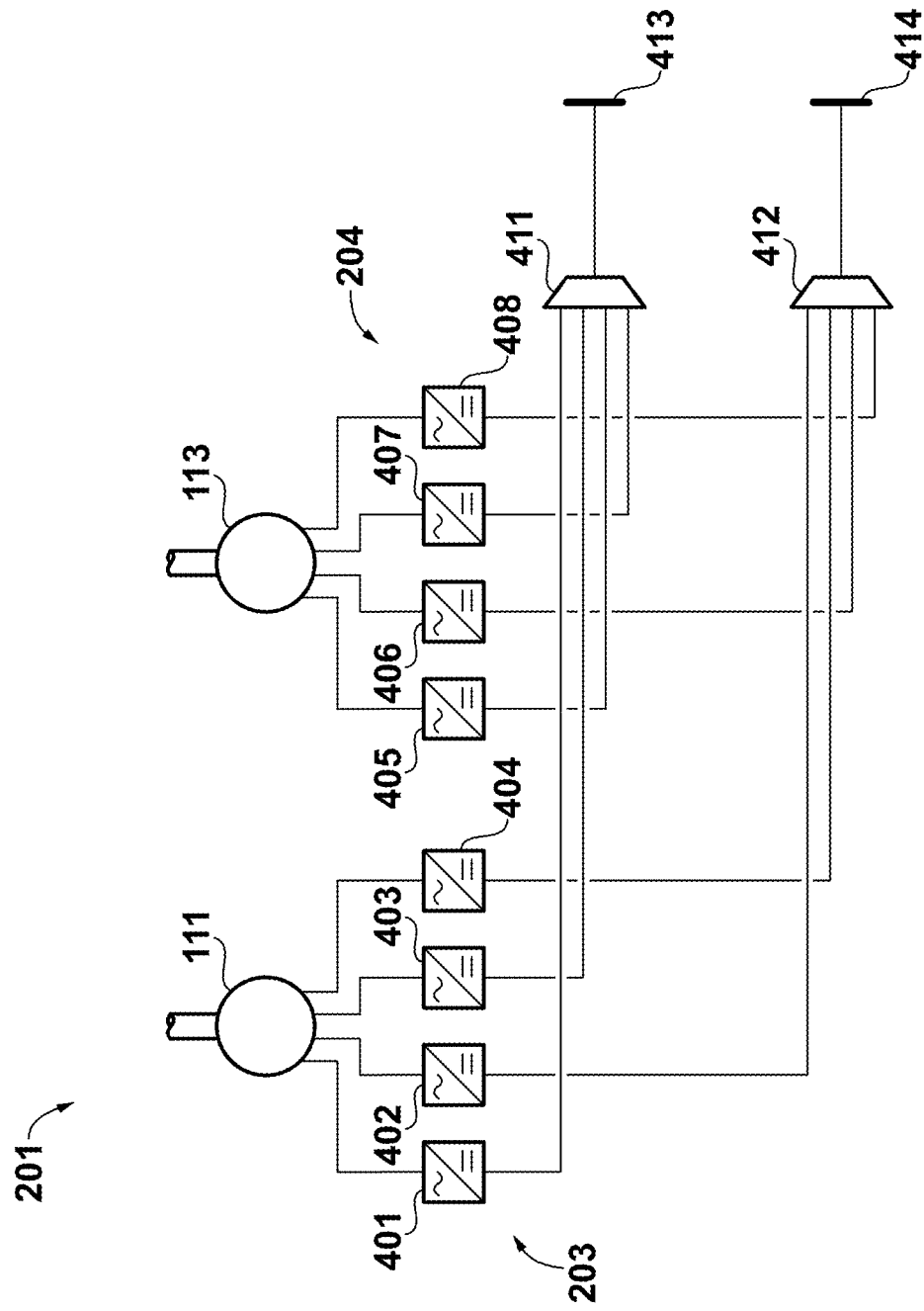
FIG. 4 shows a first embodiment of the electrical system of FIG. 2, in which the switching arrangement comprises two switch arrays.

A first embodiment of electric system 201 where N=4, P=2, and R=2 is shown in FIG. 4 in the form of a single line diagram.

As described previously with reference to FIG. 2, in general the first electric machine 111 is connected with the first set of bidirectional converter circuits 203, and the second electric machine 113 is connected with the second set of bidirectional converter circuits 204.

In the present example, both the first set of bidirectional converter circuits 203 and the second set of bidirectional converter circuits 204 comprise N=4 individual bidirectional converter circuits. In each set, each converter circuit has a respective index n and is connected with, in this embodiment, the P=2 coils in the nth phase of the associated electric machine.

In practice, therefore, and as shown in the Figure, the first set of bidirectional converter circuits 203 comprises four converter circuits 401, 402, 403, and 404 connected with the first electric machine 111. In the present example, converter circuit 401 is connected with coils 303 and 307, converter circuit 402 is connected with coils 304 and 308, converter circuit 403 is connected with coils 305 and 309, and converter circuit 401 is connected with coils 306 and 310.

A similar configuration exists for the second set of bidirectional converter circuits 204, which comprises four converter circuits 405, 406, 407, and 408 connected with the second electric machine 113 in the same manner.

In the present embodiment, the coils forming part of the same phase (i.e. coils 303 and 307, and so on) are connected to the respective bidirectional converter circuit in parallel, although it is envisaged that they may also be connected in series utilising internal connections between the coils. The choice may be made upon, for example, the ability to run cables and/or the installation space envelope for terminations, etc.

In the present embodiment, the bidirectional converter circuits 401 to 408 are H-bridges accompanied by appropriate filters. However, it will be appreciated that other suitable bidirectional converter topologies may be used, such as neutral-point clamped topologies.

In the present embodiment, the functionality of the switching arrangement 205 is implemented by R=2 switching arrays, each having an associated index r. Thus in the Figure they are identified as first switching array 411 and second switching array 412. The first switching array 411 interfaces with a first dc output 413 for connection with a first channel of the aircraft electrical system, and the second switching array 412 interfaces with a second dc output 414 for connection with a second channel of the aircraft electrical system.

In order to provide fault tolerant connection of the two electric machines with the aircraft electrical system, the bidirectional converter circuits 401 to 408 are connected by the first switching array 411 and second switching array in a specific configuration with the first and second dc outputs.

In general terms it is possible to say that, for all r, the rth dc output is connected with the dc side of the nth converter circuits in both first set 203 and the second set 204, for which n (mod R)=r is satisfied.

Applying this general principle to the example of FIG. 4, and initially considering the first dc output 413, the dc side of the first converter circuit 401 and the third converter circuit 403 in the first set 203, and the dc side of the first converter circuit 405 and the third converter circuit 407 in the second set 204, are connected to the first dc output 413 via the first switch array 411.

Now considering the second dc output 414, the dc side of the second converter circuit 402 and the fourth converter circuit 404 in the first set 203, and the dc side of the second converter circuit 406 and the fourth converter circuit 408 in the second set 204, are connected to the second dc output 414 via the second switch array 412.

It will therefore be appreciated that in this embodiment, each dc output is connected with a pair of phases in each electric machine that are separated by π/2 radians. Given the alternate-wound stator and duplex winding of this embodiment, and independent phase drive arrangement, this means that the entire electrical circuit connected with one dc output can fail but power can still be provided to and drawn from the wider electrical network on, for example, an aircraft.

FIG. 5

Figure 5:
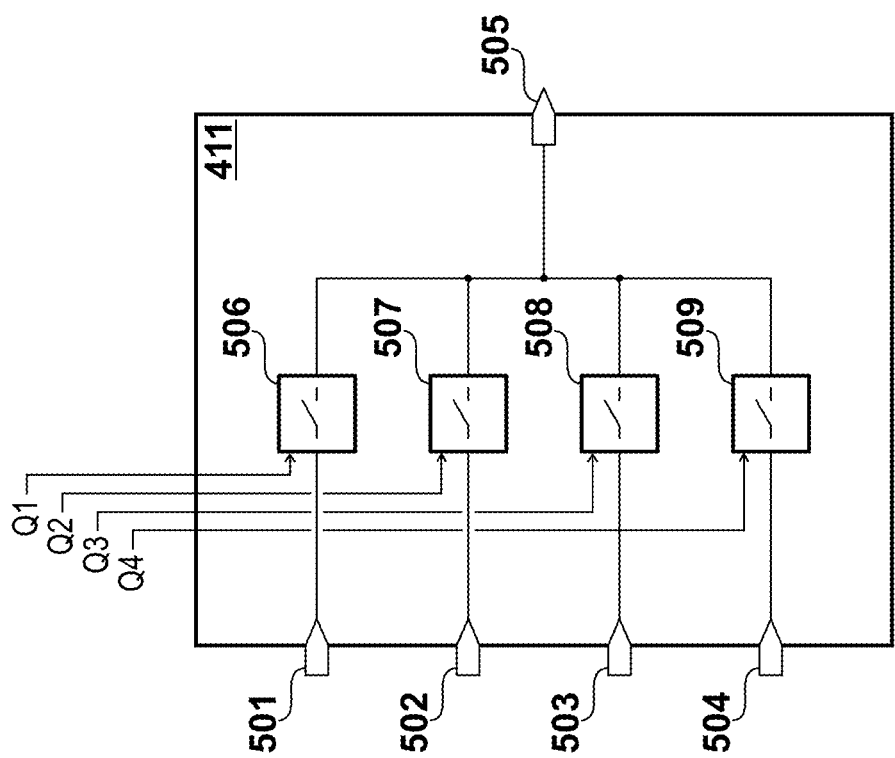
FIG. 5 shows one of the switch arrays of FIG. 4.

Detail of the first switch array 411 is shown in the form of single line diagram in FIG. 5. Second switch array 413 is similarly configured.

The switch array 411 comprises four inputs 501, 502, 503, 504 for connection with the dc sides of the bidirectional converter circuits as previously described, and an output 505 for connection with the first dc output 413. Each input 501 to 504 is connected with the output 505 via a respective switch 506, 507, 508, and 509.

In a specific embodiment, the switches 506 to 509 are dc contactors, which as will be familiar to those skilled in the art are electrically-controlled switch used for switching an electrical power circuit, where the control circuit has a lower power level than the switched circuit. This is advantageous as in the contemplated implementations of the electrical system 201, the power levels may be in excess of 500 kilowatts at 540 volts dc.

In the present embodiment, the switches 506 to 509 operate under the control of controller 202, which provides respective control signals Q1, Q2, Q3, and Q4 to the switches. In this way, it is possible to isolate any one of the inputs and output during a fault condition and to continue to operate the rest of the electrical system 201. The fault may be any type of fault which risks the safe operation of the system, for example a short circuit or an earth fault. Such faults may be sensed by the controller 202 on the basis of a measurement of any of current flow or voltage of each phase. For example, the fault may be sensed using one or more of overcurrent protection, ground (earth) fault protection, unit (or differential) protection and negative phase sequence protection. The fault may be sensed by one or more of a current transformer and a voltage transformer, or digital equivalents.

Recalling that switch array 411 and switch array 413 are of the same configuration, it will therefore be appreciated that, for all n, the dc side of the nth converter circuit in the first set 203 is connected with the dc side of the nth converter circuit in the second set 204. In this way, power transfer between the spools of the engine 101 may be achieved by way of dc power.

In the present embodiment, given R=2, converter circuits with odd ordinals are connected to each other via the first switch array 411, and converter circuits with even ordinals are connected to each other via the second switch array 412. It will be appreciated that for greater values of N and greater values of R, more switch arrays will be provided for connection with the R-channel aircraft electrical system

FIG. 6

A second embodiment of the electrical system is shown in FIG. 6, again in the form of a single line diagram. The electrical system is identified as 201', and N=4, P=2, and R=2.

In this embodiment, features in common with the first embodiment described with reference to FIG. 4 are identified with like numerals.

The primary difference in this second embodiment concerns the switch arrays. In this embodiment, four switch arrays are provided to implement the functionality of the switching arrangement 205: first switch array 601, second switch array 602, third switch array 603, and fourth switch array 604.

Thus, it will be seen that, in general terms, N switch arrays are provided, each having a respective index n. In this implementation, for all n, the nth switch array is configured to connect the dc side of the nth converter circuit in the first set 203 to the dc side of the nth converter circuit in the second set 204. In this way, power transfer between the spools of the engine 101 may be achieved by way of dc power.

It will be appreciated that this arrangement is of the same functionality as that of the first embodiment, however the separation out of the switch arrays means such that power transfer only occurs between equivalent phases in each electric machine ensures that a single faulted phase has no effect on the power transfer function. Two possible embodiments of the switch arrays 601 to 604 will be described with reference to FIGS. 7 and 8.

Figure 6:
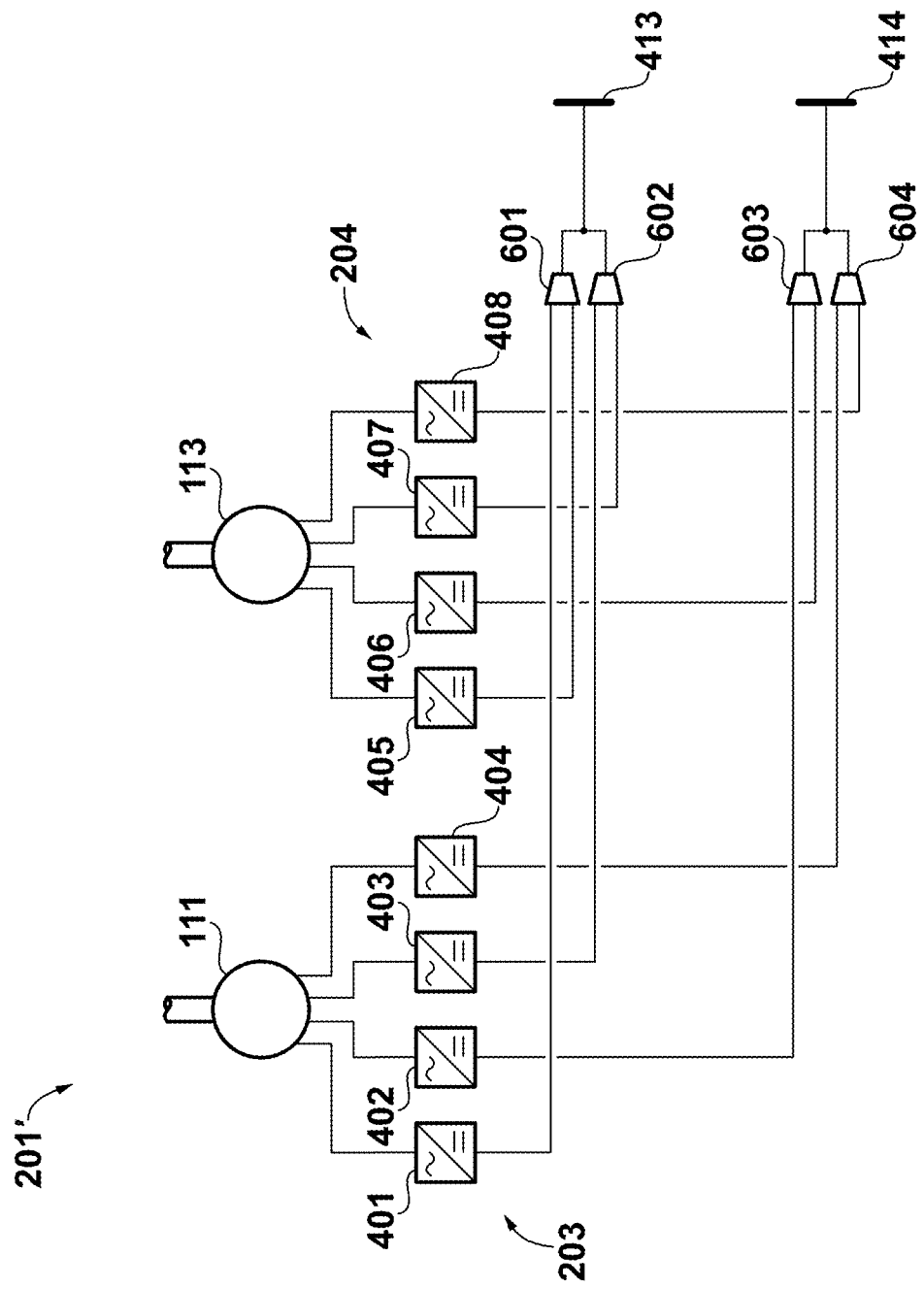
FIG. 6 shows a second embodiment of the electrical system of FIG. 2, in which the switching arrangement comprises two switch arrays.

In the embodiment of FIG. 6, it will be noted that the nth switch array further provides for connection of the nth converter circuits to the dc output determined by the relation previously described with reference to FIG. 4. Thus, the first switch array 601 connects the converter circuit 401 and the converter circuit 405 together for power transfer, and also to the first dc output 413. Similarly, the second switch array 602 connects the converter circuit 403 and the converter circuit 407 together for power transfer, and also to the first dc output 413. The same principle applies for the converter circuit 603 and converter circuit 604 connected with the second dc output 414.

FIG. 7

Figure 7:
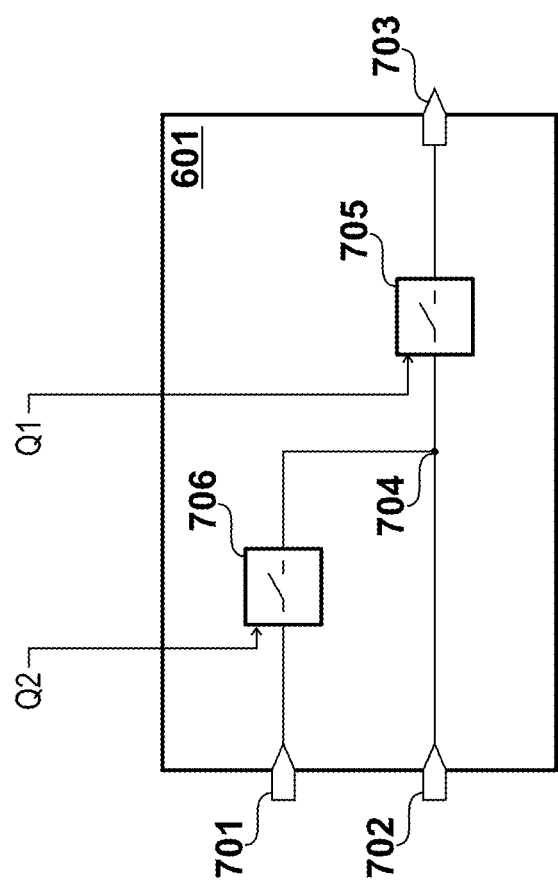
FIG. 7 shows one embodiment of one of the switch arrays of FIG. 6.

Detail of one embodiment of the first switch array 601 is shown in the form of single line diagram in FIG. 7. Switch array 602 to 604 would be similarly configured in a practical implementation of the electrical system of FIG. 6.

The switch array 601 comprises a first input 701 for connection with one of the converter circuits, a second input 702 for connection with another one of the converter circuits, and an output 703 for connection with a dc output. In the present example, the first input 701 is connected with the first bidirectional converter circuit 401 in the first set 203, and the second input 702 is connected with the first bidirectional converter circuit 405 in the second set 204. The output 703 is connected with the first dc output 413. Both the first input 701 and the second input 702 are connected to the output 703 via a node 704.

In order to facilitate connection of inputs and output, a first switch 705 is provided between the first input 501 and the node 504, and a second switch 706 is provided between the node 504 and the output 503.

One advantage of this arrangement is that the number of switches is minimised, reducing complexity and likelihood of failure. Further, the first switch 705 only requires half the rating of switch 706 in terms of current carrying capacity. In a specific embodiment, the switches 705 and 706 are dc contactors.

In the present embodiment, the switches 705 and 706 operate under the control of controller 202, which provides respective control signals Q1 and Q2 to the switches. In this way, it is possible to isolate the inputs from the output and vice versa during fault conditions and to continue to operate the rest of the electrical system 201.

In operation, there are three possible states with associated switching states for the first switch array 601: one no-fault condition and two fault conditions.

The primary mode of operation is the no-fault condition. The first fault condition is the existence of a fault at the dc output 413, for example on the wider electrical network. The second fault condition is either the existence of a fault between the first electric machine 111 and the first bidirectional converter circuit 401 in the first set 203, or between the second electric machine 113 and the first bidirectional converter circuit 405 in the second set 204.

Control signals Qn associated with these fault conditions are set out in Table 1 below, in which a "0" indicates an open switch, and a "1" indicates a closed switch:

TABLE 1

| Fault Condition | Q1 | Q2 |
| --- | --- | --- |
| No-fault | 1 | 1 |
| First | 1 | 0 |
| Second | 0 | 0 |

Thus, in the no-fault condition, the first switch 705 and the second switch 706 are closed allowing current to flow as normal between the bidirectional converter circuits 401 and 405 and the first dc output 413.

Should a fault occur outwith the electrical system 201', first switch 705 may be opened to isolate the bidirectional converter circuits 401 and 405 from the first dc output 413, thereby allowing power transfer to continue between the spools of the engine 101.

If a fault occurs between either electric machine and the respective sets of bidirectional converter circuits, both the first switch 705 and the second switch 706 may be opened so as to isolate the fault both as between the electric machines and sets of bidirectional converter circuits, and also from the first dc output 413.

FIG. 8

Figure 8:
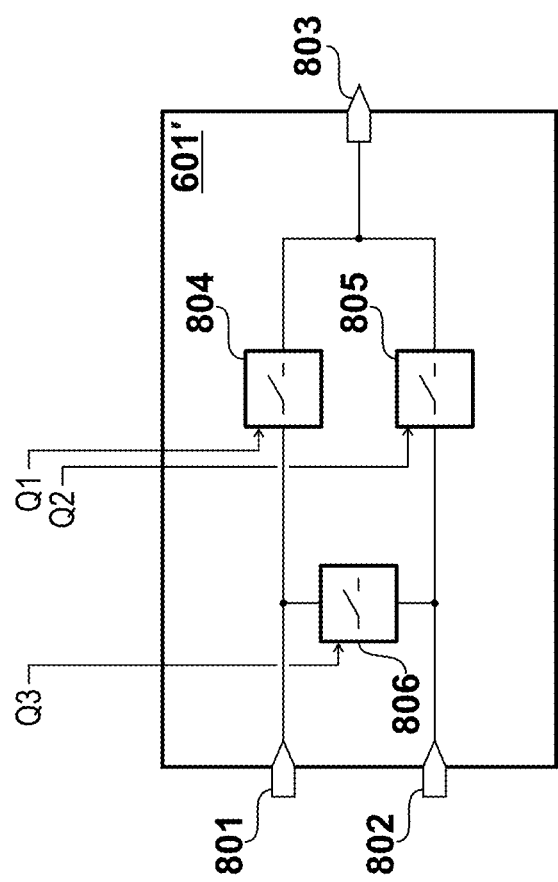
FIG. 8 shows another embodiment of one of the switch arrays of FIG. 6.

Detail of another embodiment of the first switch array, identified as 601', is shown in the form of single line diagram in FIG. 8. Switch arrays 602 to 604 would be similarly configured in a practical implementation of the electrical system of FIG. 6.

The switch array 601' comprises a first input 801 for connection with one of the converter circuits, a second input 802 for connection with another one of the converter circuits, and an output 803 for connection with a dc output. In the present example, the first input 801 is connected with the first bidirectional converter circuit 401 in the first set 203, and the second input 802 is connected with the first bidirectional converter circuit 405 in the second set 204. The output 803 is connected with the first dc output 413. Both the first input 801 and the second input 802 are connected to the output 803.

In order to facilitate connection and disconnection of inputs and output, a first switch 804 is provided between the first input 801 and the output 803, a second switch 805 is provided between the second input 802 and the output 803, and a third switch 806 is provided in a bus tie across the first input 801 and second input 802.

One advantage of this arrangement is that each switch 804 to 806 may be configured with the same voltage and current rating, and thus may be provided as identical parts. In a specific embodiment, the switches 804 to 806 are dc contactors.

In the present embodiment, the switches 804 to 806 operate under the control of controller 202, which provides respective control signals Q1, Q2, and Q3 to the switches. In this way, it is possible to isolate any one of the inputs and output during a fault condition and to continue to operate the rest of the electrical system 201'.

In operation, the controller 202 is configured to respond to four possible operating conditions with appropriate switching states for the first switch array 406: one no-fault condition and three fault conditions. The fault may be any type of fault which risks the safe operation of the system, for example a short circuit or an earth fault. Such faults may be sensed by the controller 202 on the basis of a measurement of any of current flow or voltage of each phase. For example, the fault may be sensed using one or more of overcurrent protection, ground (earth) fault protection, unit (or differential) protection and negative phase sequence protection. The fault may be sensed by one or more of a current transformer and a voltage transformer, or digital equivalents.

The primary mode of operation is the no-fault condition. The first fault condition is the existence of a fault between the first electric machine 111 and the first bidirectional converter circuit 401 in the first set 203. The second fault condition is the existence of a fault between the second electric machine 113 and the first bidirectional converter circuit 405 in the second set 204. The third fault condition is the existence of a fault at the dc output 413, for example on the wider electrical network.

Control signals Qn associated with these fault conditions are set out in Table 2 below, in which a "0" indicates an open switch, and a "1" indicates a closed switch:

TABLE 2

| Fault Condition | Q1 | Q2 | Q3 |
|---|---|---|---|
| No-fault | 1 | 1 | 0 |
| First | 0 | 1 | 0 |
| Second | 1 | 0 | 0 |
| Third | 0 | 0 | 1 |

Thus, in the no-fault condition the first switch 804 and the second switch 805 are closed, whilst the third switch 806 in the bus tie across the first input 801 and the second input 802 is open. In this way, current flows as normal between the bidirectional converter circuits 401 and 405 and the first dc output 413.

For each of the other fault conditions as defined previously, the switches 804 to 806 are configured to isolate the faulted part of the electrical system 201' from the remaining, operational parts. Power transfer between the gas turbine spools is possible in the presence of a fault outwith the electrical system 201' by provision of switch 806 in the bus tie across the first input 801 and second input 802, which is closed by the controller in the third fault condition. Supply of power to and from a non-faulted phase is possible even in the presence of a fault between one of the electric machines and the associated bidirectional converter circuit by the provision of switches 804 and 805, which can isolate the faulty phase and maintain connection of the non-faulted phase with the dc output.

FIG. 9

Figure 9:
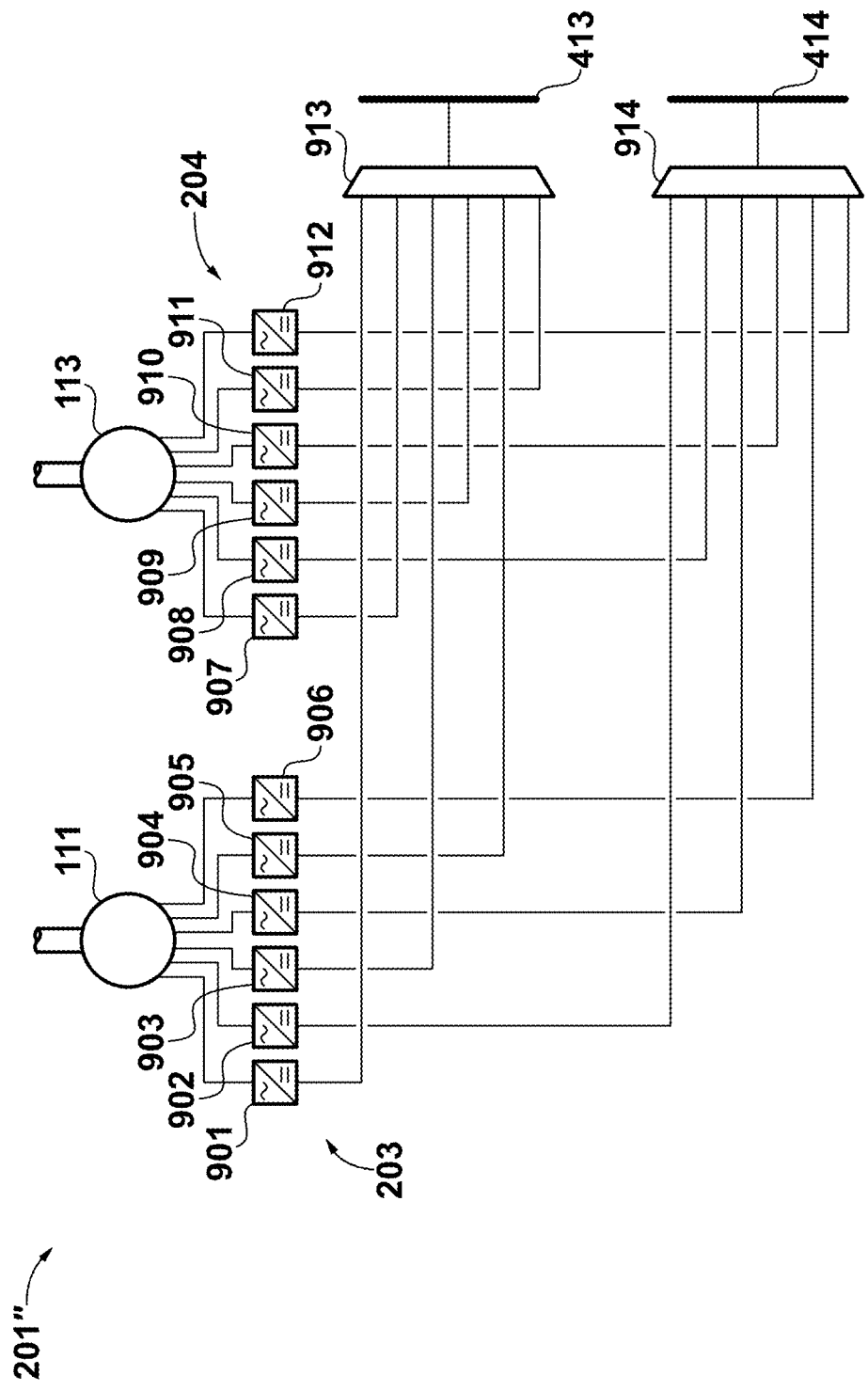
FIG. 9 shows a third embodiment of the electrical system of FIG. 2.

Another example of the electrical system is shown in FIG. 9 in the form of a single line diagram. The electrical system is identified as 201" and N=6, P=4, and R=2. Features in common with the first embodiment of the electrical system 201 are identified with like numerals.

As illustrated in the Figure, the first set of bidirectional converter circuits 203 comprises N converter circuits 901 through 906. Similarly, the second set of bidirectional converter circuits 204 comprises N converter circuits 907 through 912, each also having an associated index n.

The electrical system 201" further comprises R dc outputs: first dc output 413 and second dc output 414, each having an associated index r. Furthermore, as shown, for all r, the rth dc output is connected with the dc side of the nth converter circuits in both the first set 203 and the second set 204, for which n (mod R)=r is satisfied. This is achieved in the present embodiment via a first switch array 913 and a second switch array 914.

It is contemplated that either the connection topology of the first embodiment of the electrical system 201 or of the second embodiment of the electrical system 201' could be used depending upon the level of fault tolerance required.

FIG. 10

Figure 10:
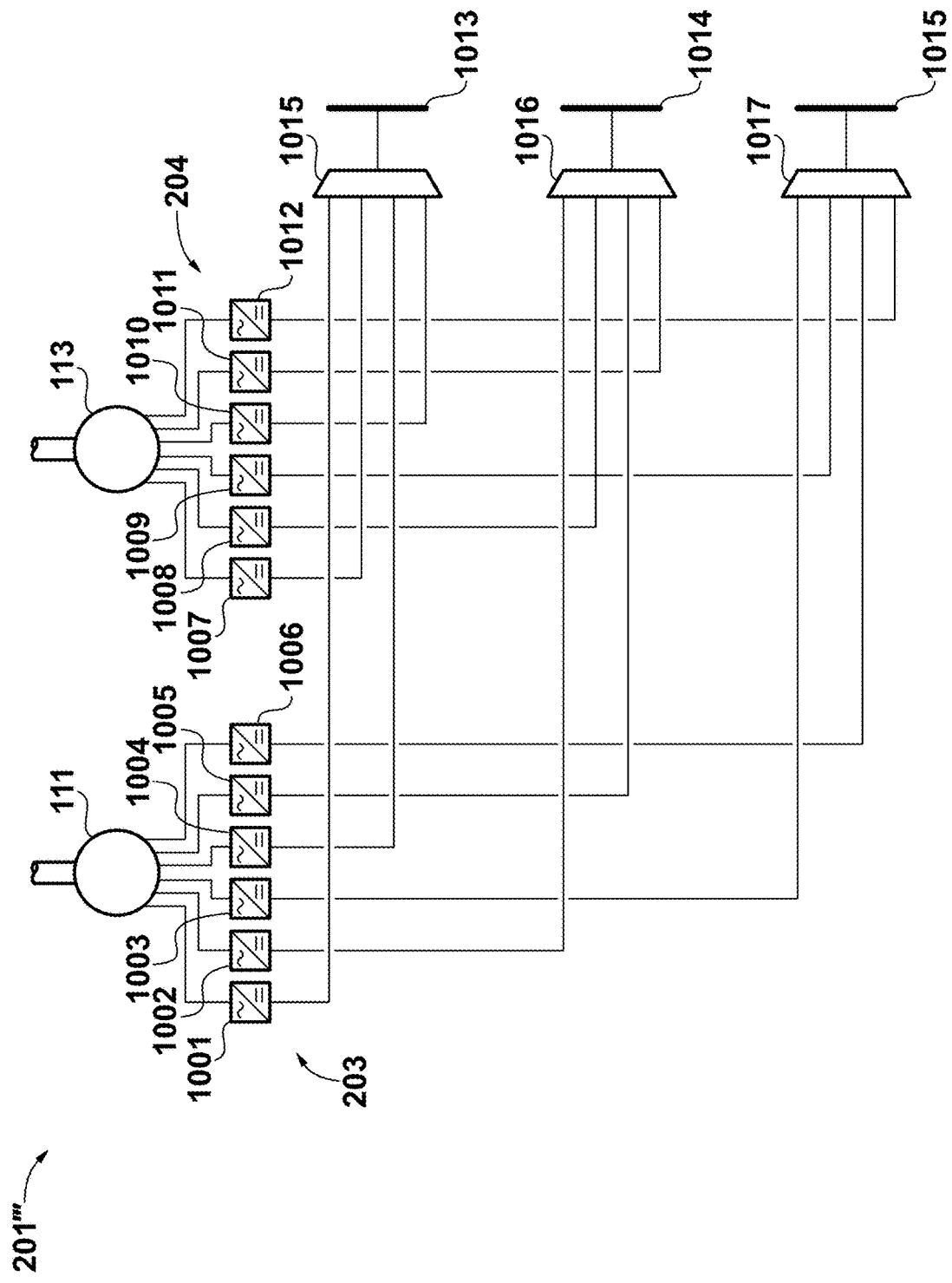
FIG. 10 shows a fourth embodiment of the electrical system of FIG. 2.

A further example of the electrical system is shown in FIG. 10 in the form of a single line diagram. The electrical system is identified as 201'" and N=6, P=2, and R=3. Features in common with the first embodiment of the electrical system 201 are identified with like numerals.

As illustrated in the Figure, the first set of bidirectional converter circuits 203 comprises N converter circuits 1001 through 1006. Similarly, the second set of bidirectional converter circuits 204 comprises N converter circuits 1007 through 1012, each also having an associated index n.

In this embodiment, the electrical system 201'" further comprises R dc outputs: first dc output 1013, second dc output 1014, and third dc output 1015, each having an associated index r. Thus, this electrical system may be utilised in electrical networks having three dc channels.

As shown, for all r, the rth dc output is connected with the dc side of the nth converter circuits in both the first set 203 and the second set 204, for which n (mod R)=r is satisfied. This is achieved in the present embodiment via a first switch array 1015, a second switch array 1016, and a third switch array 1017.

Again, it is contemplated that either the connection topology of the first embodiment of the electrical system 201 or of the second embodiment of the electrical system 201' could be used depending upon the level of fault tolerance required.

FIG. 11

Figure 11:
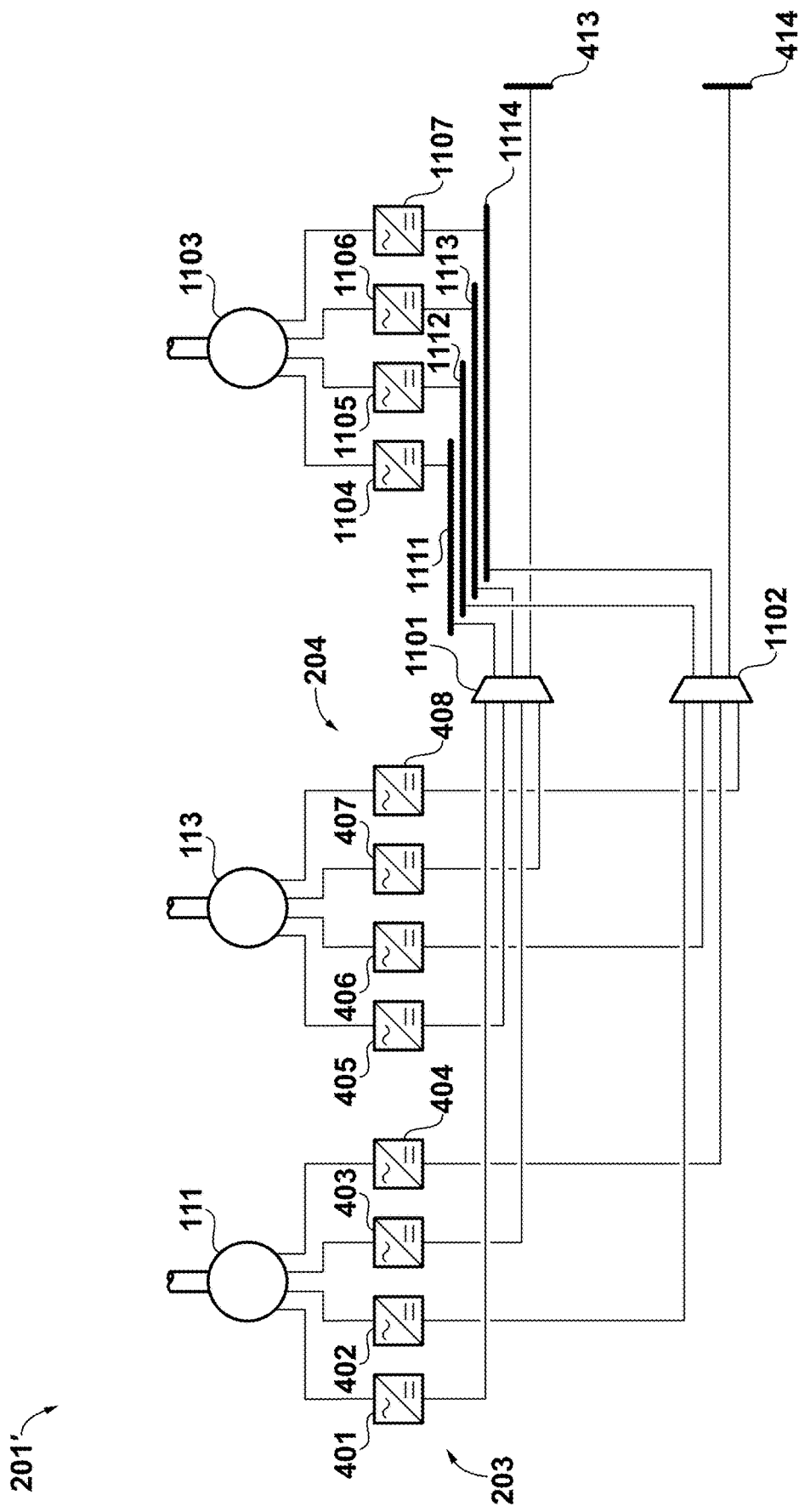
FIG. 11 shows a fifth embodiment of the electrical system of FIG. 2, in which the switching arrangement comprises two switch arrays for connecting the electric machines with two output busses and four engine busses.

It is envisaged that the principles of the present invention may also be extended to support fault-tolerant engine accessories, such as a fuel pump or an oil pump. Such an arrangement is shown in FIG. 11, which is based upon the second embodiment of the electrical system 201', and thus like numerals are used to identify the same features. Furthermore, in this example, N=4, P=2, and R=2

In addition to the first dc output 413 and the second dc output 414, N engine dc busses are provided, each having an associated index n. In particular, a first switch array 1101 connects the first converter circuits 401 and 405 and the third converter circuits 403 and 407 to the first dc output 413 and also to a first engine dc bus 1111 and a third engine dc bus 1113. A second switch array 1102 connects the second converter circuits 402 and 406 and the fourth converter circuits 404 and 408 to the second dc output 414 and also to a second engine dc bus 1112 and a fourth engine dc bus 1114.

An electric machine 1103, which for example may electrically drive a fuel pump or an oil pump, is driven via four converter circuits 1104, 1105, 1106, and 1107. The electric machine 1103 comprises the same number of phases N as the electric machines 111 and 113. In a specific embodiment, the number of coils per phase in the electric machine 1105 is 1. Alternatively, it may be 2. It may be identical with the electric machines 111 and 113, i.e. equal to P. Further, in a specific embodiment, given the electric machine 1105 is only required to drive an engine accessory and not to generate any power, the converter circuits 1104 through 1107 are configured as inverters for converting dc to ac. Alternatively, however, the converter circuits may be bidirectional converters depending upon the nature of the accessory being driven.

FIG. 12

Figure 12:
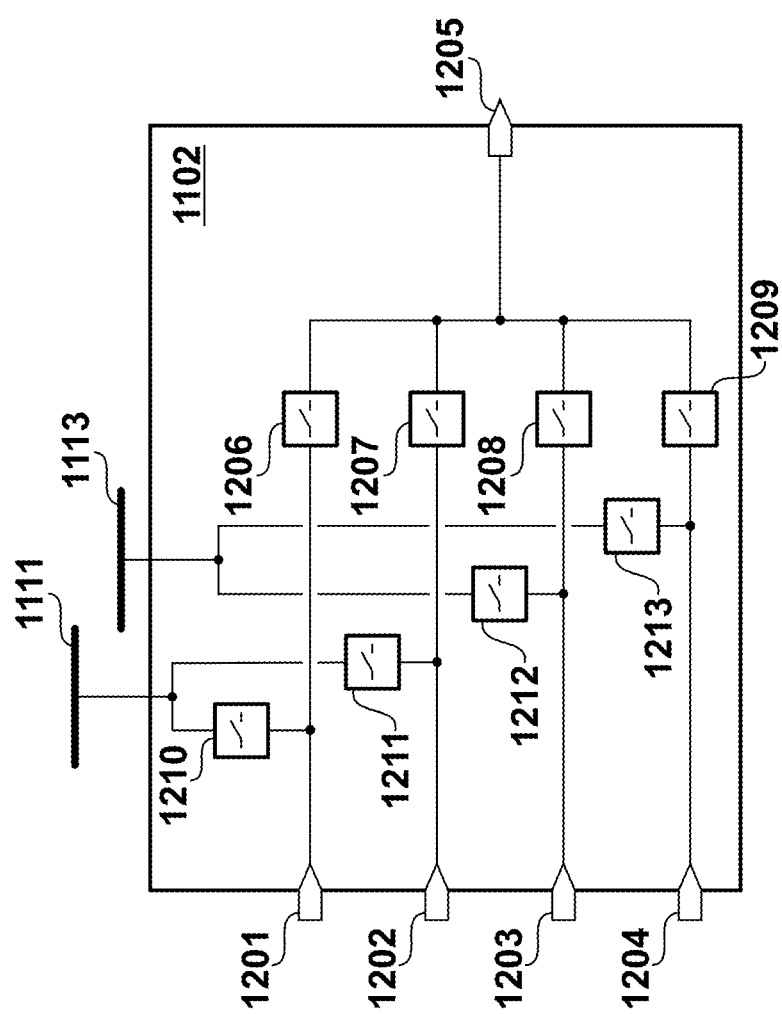
FIG. 12 shows one of the switch arrays of FIG. 11.

A single line diagram of the connection between the first switch array 1101, the dc output 413 and the engine dc busses 1111 and 1113 is shown in FIG. 12.

The second switch array 1102 and the connections to the dc output 414 and the engine dc busses 1112 and 1114 are equivalent.

The switch array 1101 comprises four inputs 1201, 1202, 1203, 1204 for connection with the dc sides of the bidirectional converter circuits 401, 405, 403 and 407 respectively. The switch array further comprises an output 1205 for connection with the first dc output 413. Each input 1201 to 1204 is connected with the output 1205 via a respective switch 1206, 1207, 1208, and 1209.

The first engine dc bus 1111 is connected between the first input 1201 and the switch 1206 via a switch 1210, and is further connected between the second input 1202 and the switch 1207 via a switch 1211.

The third engine dc bus 1113 is connected between the third input 1203 and the switch 1208 via a switch 1212, and is further connected between the fourth input 1204 and the switch 1209 via a switch 1213.

Thus, in general terms, the nth engine dc bus is connected with the nth bidirectional converter circuit in each of the first set 203 and the second set 204. In this way, fault tolerant supply of the engine dc busses is achieved. In an embodiment, this fault tolerant supply allows removal of the permanent magnet alternator from the engine 101, as each engine dc bus is supplied from two independent coil pairs in each electric machine 111 and 113. In operation, this arrangement retains full fault tolerance vis-à-vis the loads connected with the engine dc busses, even in the presence of a single fault elsewhere in the system. In this way, dispatch of an aircraft with said fault is still permitted.

As described previously, whilst the present embodiments have been described in the context of transferring power between spools within a gas turbine engine, it will be appreciated by those skilled in the art that the principles of the invention may be applied to arrangements comprising two separate gas turbine engines, each with a respective spool.

Furthermore, it is contemplated that the electrical system configuration described herein may be extended to facilitate connection of rotary electric machines with other types of rotating machinery. For example, the rotary electric machines may be connected with other types of heat engines, for example internal combustion engines such as reciprocating or Wankel-type engines. Other types of heat engines such as steam turbines operating according to the Rankine cycle may be connected. Combinations of different types of rotating machinery may be connected.

Thus it will be appreciated that the invention described herein may be expressed as an electrical system for connecting rotary electric machines with other rotating machines, the system having the properties and attributes heretofore described.

It should also be noted that whilst the present embodiments have been described with reference to a turbofan engine 101 for an aircraft, it will be understood that the principles of the described electrical systems may be applied to other installations, for example in a marine environment such as on a naval vessel powered by gas turbines, or in an energy production environment such as in a power station utilising natural gas fired gas turbines, or any other suitable application.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. An electrical system for connecting rotary electric machines with gas turbine spools, the electrical system comprising:
   a first rotary electric machine mechanically coupled with a first gas turbine spool and a second rotary electric machine mechanically coupled with a second gas turbine spool,
   each rotary electric machine having an identical even number $N \geq 4$ of phases, each phase having a respective index $n=(1, \ldots, N)$, and
   each phase comprising an identical number $P \geq 1$ of coils wound in a configuration in which adjacent phases are radially separated by $2\pi/NP$ mechanical radians;
   a first set of N bidirectional converter circuits for conversion of alternating current (ac) to and from direct current (dc),
   each converter circuit of the first set of N bidirectional converter circuits having an ac side and a dc side, the ac side of each converter circuit of the first set being connected with the first rotary electric machine, and
   each converter circuit of the first set having a respective index n and being connected at an ac side with the P coils in the nth phase of the first rotary electric machine;
   a second set of N bidirectional converter circuits for conversion of ac to and from dc,
   each converter circuit of the second set of N bidirectional converter circuits having an ac side and a dc side, the ac side of each converter circuit of the second set being connected with the second rotary electric machine, and
   each converter circuit of the second set having a respective index n and being connected at an ac side with the P coils in the nth phase of the second rotary electric machine;
   an R-channel electrical network; and
   a switching arrangement having a number R of dc outputs for connection with the R-channel electrical network,
   wherein each dc output has respective index $r=(1, \ldots, R)$,
   wherein R satisfies $1 \leq R \leq N/2$, and
   wherein for all r, the switching arrangement connects the rth dc output with the dc side of the nth converter circuits in both the first set and second set, for which $n(\text{mod } R)=r$ is satisfied.

2. The electrical system of claim 1, wherein for each rotary electric machine, the identical even number $N=4$ phases.

3. The electrical system of claim 1, wherein for each phase, the identical number $P=2$ coils, such that the coils are wound in a duplex configuration.

4. The electrical system of claim 1, the number of dc outputs for connection with an R-channel electrical network is $R=2$.

5. The electrical system of claim 1, wherein, for all n, the switching arrangement connects a dc side of the nth converter circuit in the first set is connected with a dc side of the nth converter circuit in the second set to facilitate dc power transfer between the first gas turbine spool and the second gas turbine spool.

6. The electrical system of claim 5, wherein
   the switching arrangement comprises N switch arrays, each having a respective index n, and
   for all n, the nth switch array is configured to connect the nth converter circuits in the first and second sets to a corresponding dc output.

7. The electrical system of claim 6, wherein each switch array comprises:
   a first input connected with one of the converter circuits of the first set of converter circuits;
   a second input connected with another of the converter circuits of the second set of converter circuits;
   a switch array output for connection to a corresponding dc output, and to which the first input and the second input are connected;
   a first switch between the first input and the switch array output;
   a second switch between the second input and the switch array output;

a bus tie across the first input and the second input, the bus tie comprising a third switch.

8. The electrical system of claim 7, wherein the switch arrays are configured to operate in:
 a non-fault condition in which the first switch and the second switch are closed, and the third switch is open;
 a first fault condition in which the first switch is closed and the second and third switches are open;
 a second fault condition in which the second switch is closed and the first and third switches are open;
 a third fault condition in which the third switch is closed and the first and second switches are open.

9. The electrical system of claim 7, wherein the first, second, and third switches all have the same electrical rating.

10. The electrical system of claim 6, wherein each switch array comprises:
 a first input connected with one of the converter circuits of the first set of converter circuits;
 a second input connected with another of the converter circuits of the second set of converter circuits;
 a switch array output for connection with a corresponding dc output;
 a node with which the first input, the second input and the switch array output are connected;
 a first switch between the first input and the node;
 a second switch between the node and the switch array output.

11. The electrical system of claim 10, wherein the switch arrays are configured to operate in:
 a non-fault condition in which the first switch and the second switch are closed;
 a first fault condition in which the first switch is closed and the second switch is open;
 a second fault condition in which the first and second switches are open.

12. The electrical system of claim 10, wherein the first switch has half the electrical rating of the second switch.

13. The electrical system of claim 6, wherein the switches are dc contactors.

14. A gas turbine engine comprising:
 a low-pressure spool;
 a high-pressure spool; and
 the electrical system of claim 1, wherein
 the first gas turbine spool is the low-pressure spool, and
 the second gas turbine spool is the high-pressure spool.

15. An aircraft having an R-channel electrical network and comprising:
 the gas turbine of claim 14.

16. An arrangement comprising:
 a first gas turbine engine having a spool;
 a second gas turbine engine having a spool; and
 the electrical system of claim 1, wherein
 the first gas turbine spool is the spool in the first gas turbine engine, and
 the second gas turbine spool is the spool in the second gas turbine engine.

17. An aircraft having an R-channel electrical network and comprising:
 the arrangement of claim 16.

* * * * *